(12) United States Patent
Tatsuda

(10) Patent No.: US 7,931,131 B2
(45) Date of Patent: Apr. 26, 2011

(54) ROTATIONAL RESISTANCE APPLYING DEVICE IN MAIN SHAFT DRIVING DEVICE FOR MACHINE TOOL

(75) Inventor: Yoshinori Tatsuda, Kanazawa (JP)

(73) Assignee: Tsudakoma Kogyo Kabushiki Kaisha, Kanazawa-shi (JP)

( * ) Notice: Subject to any disclaimer, the term of this patent is extended or adjusted under 35 U.S.C. 154(b) by 0 days.

(21) Appl. No.: 12/730,887

(22) Filed: Mar. 24, 2010

(65) Prior Publication Data

US 2010/0258397 A1 Oct. 14, 2010

(30) Foreign Application Priority Data

Apr. 14, 2009 (JP) ................................. 2009-097549

(51) Int. Cl.
*B23Q 16/10* (2006.01)
(52) U.S. Cl. ...................................... 188/170; 74/813 C
(58) Field of Classification Search ................ 74/813 C, 74/813 L, 813 R, 819; 269/57, 63, 73, 74; 188/74, 78, 170
See application file for complete search history.

(56) References Cited

U.S. PATENT DOCUMENTS

| | | | |
|---|---|---|---|
| 7,418,889 B2 * | 9/2008 | Nitta | 74/813 L |
| 7,634,955 B2 * | 12/2009 | Osaki et al. | 74/819 |
| 2008/0125904 A1 * | 5/2008 | Osaki et al. | 700/170 |
| 2009/0235783 A1 * | 9/2009 | Duane et al. | 74/813 C |
| 2010/0019427 A1 * | 1/2010 | Nishida | 269/74 |
| 2010/0123278 A1 * | 5/2010 | Tatsuda | 269/57 |
| 2010/0175505 A1 * | 7/2010 | Tatsuda | 74/813 L |

FOREIGN PATENT DOCUMENTS

| | | |
|---|---|---|
| JP | 2000-218404 A | 8/2000 |
| JP | 2006-95668 A | 4/2006 |

* cited by examiner

*Primary Examiner* — Christopher P Schwartz
(74) *Attorney, Agent, or Firm* — Westerman, Hattori, Daniels & Adrian, LLP

(57) ABSTRACT

A rotational resistance applying device in which a hollow roller is provided between a first surface of a clamp piston (pressing member) and a second surface of a sliding disc (a press member), and in which a pressing force applied to the clamp piston acts upon the sliding disc through the hollow roller that press-contacts the first and second surfaces by displacement of the clamp piston. By this, rolling resistance of the hollow roller resiliently deformed by the pressing force causes a rotational resistance to be applied to a main shaft within a range allowing rotation. This makes it possible to prevent pulsation from being generated in the rotation of the main shaft. In addition, even if the pressing force is applied to the clamp piston, the hollow roller rolls, so that wear of the clamp piston and wear of the sliding disc can be restricted.

3 Claims, 10 Drawing Sheets

ROTATIONAL RESISTANCE APPLYING DEVICE IN MAIN SHAFT DRIVING DEVICE FOR MACHINE TOOL

BACKGROUND OF THE INVENTION

1. Field of the Invention

The present invention relates to a rotational resistance applying device in a main shaft driving device for a machine tool. More particularly, the present invention is suitable for use in a device that applies rotational resistance to a main shaft rotatably supported by a frame of the machine tool or to a member that rotates together with the main shaft.

2. Description of the Related Art

Hitherto, as a main shaft driving drive used in a machine tool, there is known a rotary index table device that rotates a circular table by rotationally driving a main shaft to which the circular table having a workpiece placed thereon is secured. The rotary index table device is used for indexing an angular position of the circular table by rotationally driving the main shaft to process the workpiece at the indexed angular position. This type of rotary index table device includes a clamping device for holding the circular table at the indexed angular position (that is, the indexed position).

The clamping device is used for setting the main shaft (circular table) in a rotation prevention state at the indexed position. The clamping device is available in three types: a coupling type, a disc type, and a sleeve type. The coupling type stops the rotation of the main shaft by, for example, engagement coupling. The disc type stops the rotation of the main shaft by friction generated by bringing a brake plate (that is, a clamp disc), parallel to the circular table, into contact with an end face of the main shaft and pressing the clamp disc. The sleeve type stops the rotation of the main shaft by friction generated by bringing a clamp sleeve into contact with an outer peripheral face of the main shaft.

As one related art related to a rotary index table device including a clamping device, there exists the technology discussed in Japanese Unexamined Patent Application Publication No. 2006-95668 (Patent Document 1). As a driving unit of a circular table, the rotary index table device discussed in Patent Document 1 uses a direct drive motor (hereunder referred to as "DD motor") that rotationally drives a main shaft without using a driving transmission unit such as a worm gear. That is, in Patent Document 1, the circular table is set in a rotation prevention state by friction generated by bringing a brake plate into contact with the circular table, secured to the main shaft that is rotationally driven by the DD motor.

Ordinarily, the clamping device is set in a clamp state, and the rotation of the circular table is stopped, to process a workpiece. However, the clamping device may be set in an unclamp state to finish the workpiece while continuously rotating the workpiece. In this case, a main shaft driving device receives a load from a cutter that processes the workpiece. The load varies constantly even under a certain processing condition. Therefore, a rotation state of the circular table resulting from the operation of the main shaft driving device is influenced by the variations in the load received from the cutter.

If a DD motor is used as a driving unit of the main shaft as it is in Patent Document 1, the DD motor is controlled so as to eliminate the influence of the load variations. More specifically, on the basis of the rotational angle (that is, the amount of rotation) of the main shaft that is fed back from a rotation detector of the main shaft driving device, rotational driving of the DD motor is controlled while correcting deviations in the rotational angle of the main shaft caused by the variations in the load received from the cutter. However, the controlling of the DD motor cannot follow variations in the deviations of the rotational angle. In this case, the rotation of the DD motor is not necessarily constant, that is, the DD motor undergoes pulsating rotation.

Even if a driving transmission unit, such as a worm gear, is used as the driving unit of the main shaft, the main shaft may undergo pulsating rotation. Ordinarily, there is backlash in the worm gear. The term "backlash" refers to a gap deliberately provided in a travelling direction in mechanical elements, such as worms (gears), that are fitted to each other and operate. This gap makes it possible for the gears to move freely. However, the backlash causes pulsation to be generated. That is, if the rotational speed at a driving side of the gears engaging each other is changed as a result of the rotational speed being influenced by the variations in the load received from the cutter, the gears at a driven side (main shaft side) swing independently of the driving side within a backlash range due to inertia, thereby generating pulsation in the rotation of the main shaft.

If pulsation is generated in the rotation of the main shaft, pulsation is also generated in the rotation of the circular table secured to the main shaft. As a result, the surface roughness of a finishing surface of the workpiece that is being finished while rotating the circular table is increased. To overcome such a problem, a main shaft driving device that can restrict the generation of pulsation is proposed (refer to, for example, Japanese Unexamined Patent Application Publication No. 2000-218404 (Patent Document 2)).

The main shaft driving device in Patent Document 2 is related to a lathe that can process holes and grooves in a peripheral face or an end face of the workpiece by a rotating tool mounted to a tool holder while the main shaft is stopped or rotating. The object of Patent Document 2 is to prevent problems in which the shape of the workpiece is deteriorated and in which the precision of the processed surface is reduced from occurring due to a stick-slip phenomenon (pulsation) occurring when the main shaft is rotated at a low speed and the workpiece is processed.

To overcome such problems, the lathe discussed in Patent Document 2 includes a braking device for making uniform the rotation of the main shaft. The braking device includes a brake shoe, a sliding surface member, and a unit for supplying lubricating oil to a sliding contact surface of the sliding surface member. The brake shoe is press-contacted with a rotating member, such as a brake disc or a sleeve, secured to the main shaft. The sliding surface member is mounted to a sliding contact surface of the brake shoe. By rotating at a low speed the main shaft by press-contacting the brake shoe with the rotating member while supplying lubricant oil to the sliding contact surface of the sliding surface member, the difference between a coefficient of static friction and a coefficient of dynamic friction is reduced, so that the stick-slip phenomenon of the main shaft is prevented from occurring.

However, the related art discussed in Patent Document 2 is one in which rotational resistance (braking force) is applied to the main shaft by friction force between the sliding surface member (serving as a pressing member) and the rotating member (serving as a press member that is pressed) by press-contacting the brake shoe, to which the sliding surface member is mounted, with the rotating member at the main shaft. Therefore, in the related art, it is not possible to prevent wear of the rotating member and wear of the sliding surface member that slide while they are pressed. If the rotating member or the sliding surface member wears, the magnitude of rotational resistance changes, thereby making it impossible to provide sufficient rotational resistance. As a result, pulsation is generated in the rotation of the main shaft, thereby increasing the surface roughness of the finishing surface of the workpiece.

SUMMARY OF THE INVENTION

The present invention is achieved for solving such problems and its object is to make it possible to maintain the magnitude of rotational resistance applied to a main shaft by restricting wear of a pressing member and wear of a press member.

To this end, according to the present invention, a resiliently deformable member is provided between a first surface and a second surface. The first surface is a surface of a frame-side pressing member, and causes a pressing force to act upon a press member. The pressing member is formed so that at least a portion thereof is displaceable towards the main shaft. The second surface is a surface of the press member, and faces the first surface. Here, the press member corresponds to a main shaft or a member that rotates together with the main shaft (that is, a member that is rotationally driven, such as a circular table, secured to the main shaft).

According to the present invention having the above-described structure, if at least part of the pressing member is displaced towards the press member by a pressing force applying device, the rolling member interposed between the pressing member and the press member is interposed between the first surface and the second surface, and is deformed by pressing force received from the pressing member. Since the press member and the rolling member are in contact with each other, the rolling member rolls due to the rotation of the press member. Since the press member is in a state in which it rolls the rolling member while deforming the rolling member due to the aforementioned deforming operation, rotation resistance (braking force) is applied to the main shaft by rolling resistance of the rolling member. This restricts the generation of pulsation in the rotation of the main shaft. Moreover, the rolling member is interposed between the first surface of the pressing member, causes the pressing force to act upon the press member, and the second surface of the press member, which is subjected to the rotational resistance, and rolls between both of these surfaces. Therefore, even if the rotational resistance is applied to the second surface, compared to the case in which the stationary first surface press-contacts the rotating second surface as in the related art, a sliding amount between a peripheral surface of the rolling member that is press-contacted with each of the first and second surfaces is small, so that wear of the first surface and wear of the second surface is restricted. Consequently, changes in the rotational resistance caused by the wear are restricted, thereby making it possible to maintain for a long time the magnitude of the rotational resistance applied to the main shaft.

DESCRIPTION OF THE PREFERRED EMBODIMENTS

Figure 1:
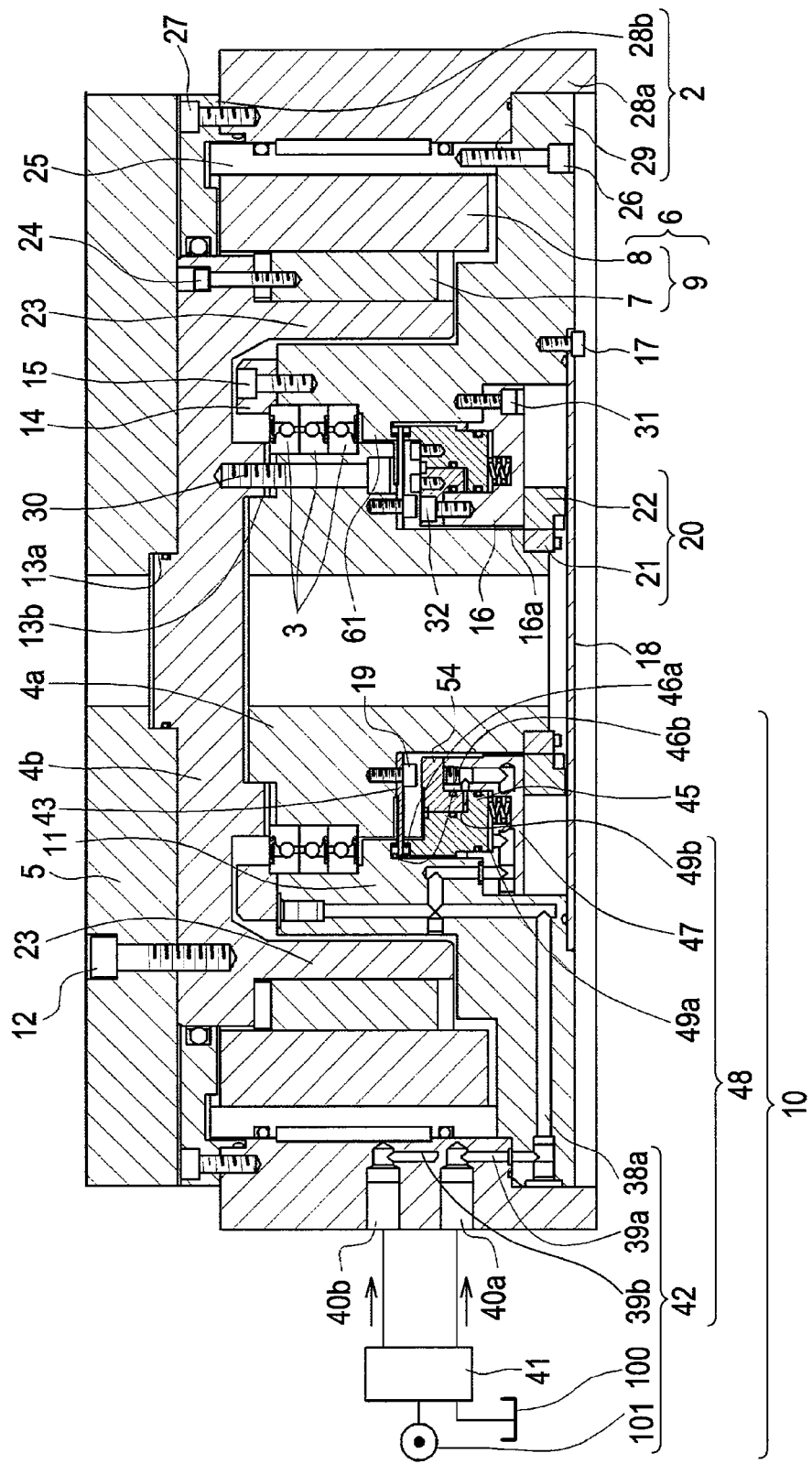
FIG. 1 shows an exemplary structure of a main shaft driving device for a machine tool including a rotational resistance applying device according to the present invention.

An embodiment of the present invention will hereunder be described with reference to the drawings. FIG. 1 shows an exemplary structure of a main shaft driving device for a machine tool including a rotational resistance applying device according to the present invention. FIG. 1 shows an exemplary structure of a rotary index table device as the main shaft driving device. A member that is rotationally driven in this case is a circular table on which a workpiece (which is a processing object) is placed. Further, in the embodiment shown in FIG. 1, a DD motor that rotationally drives a main shaft without using driving transmission unit (such as a gear) is used as a driving unit of the main shaft.

Figure 2:
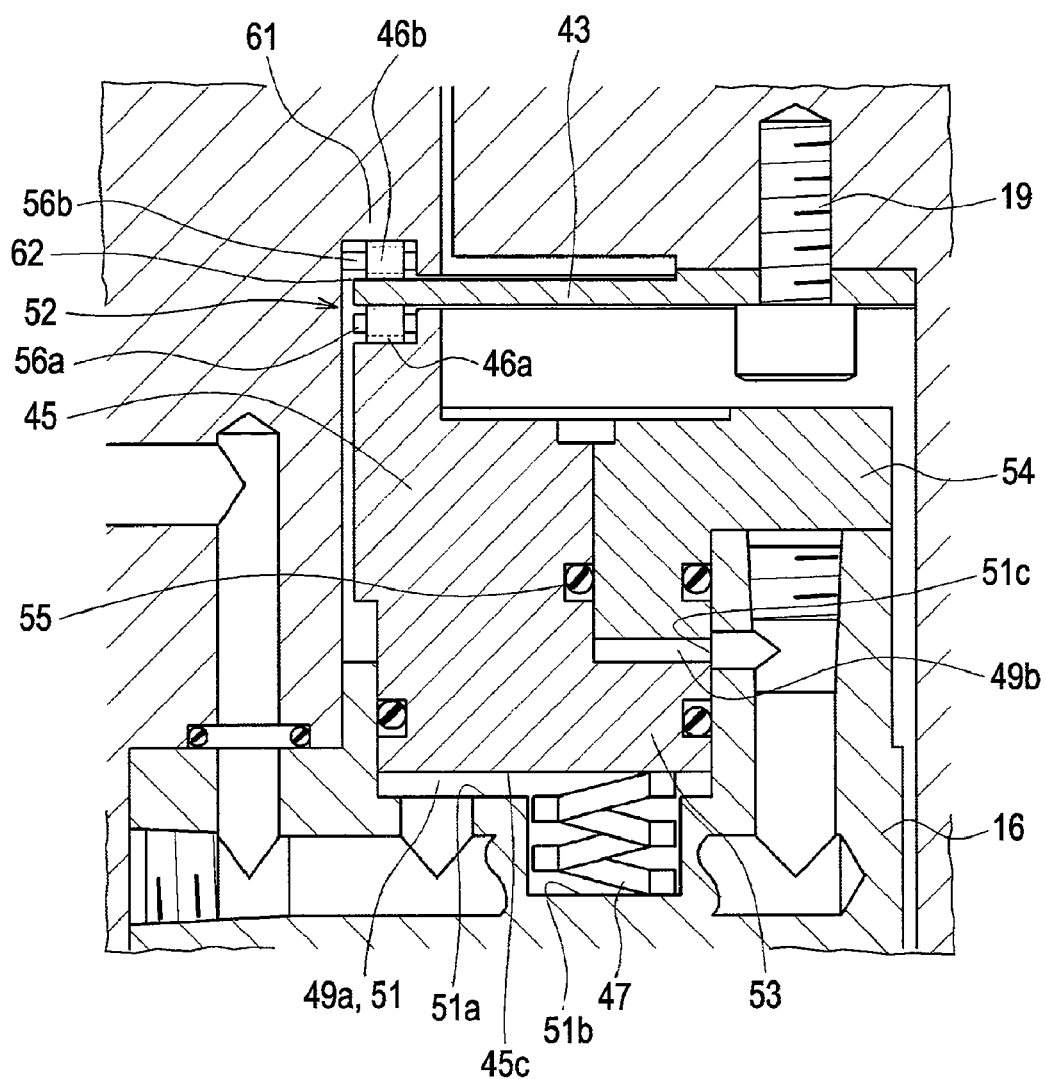
FIG. 2 shows an exemplary structure of the rotational resistance applying device according to the present invention.
Figure 3:
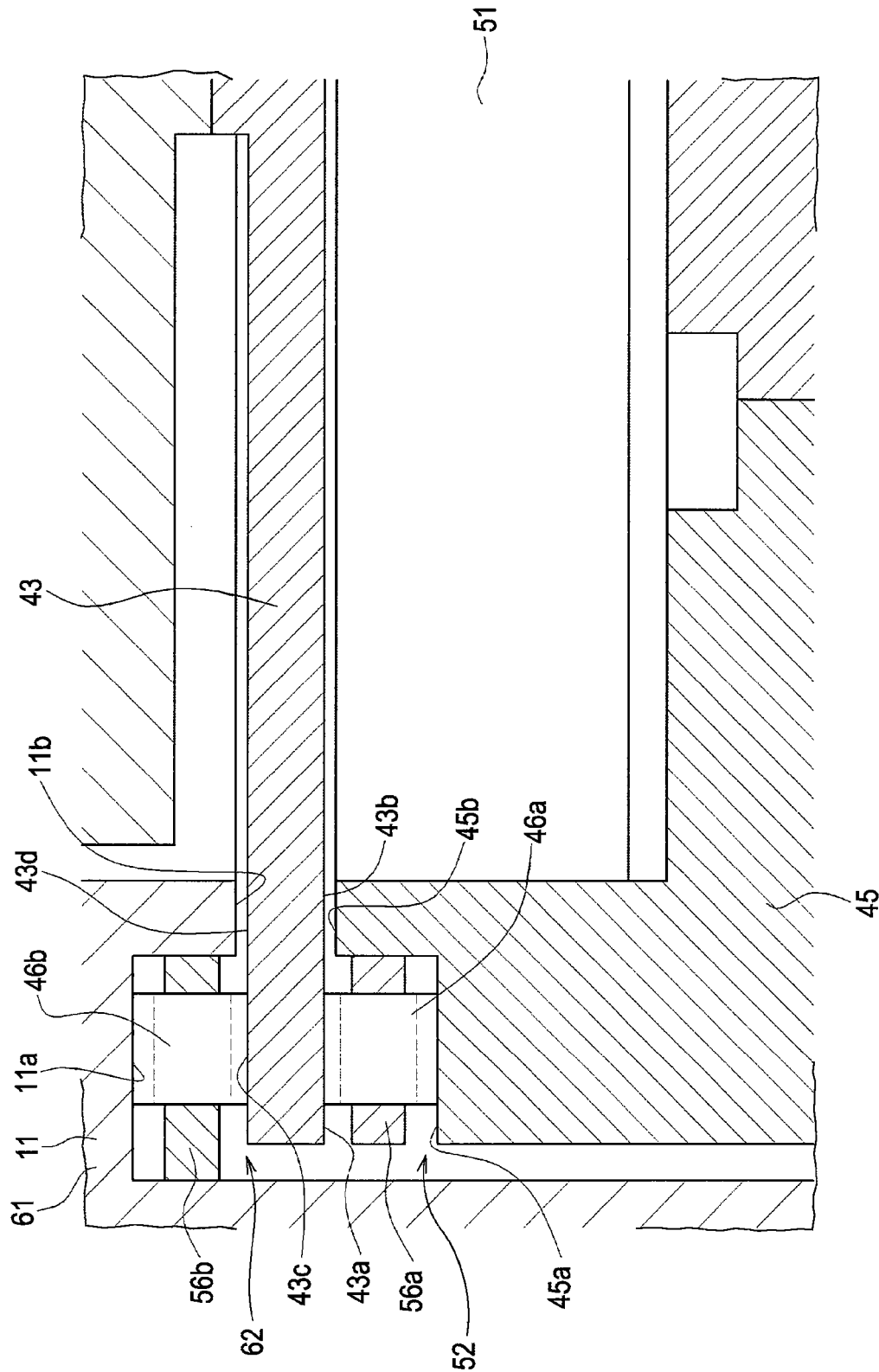
FIG. 3 is an enlarged view of part of the rotational resistance applying device according to the present invention.

FIG. 2 shows an exemplary structure of the rotational resistance applying device according to the present invention. FIG. 3 is an enlarged view of part of FIG. 2. The rotational resistance applying device shown in FIGS. 2 and 3 is related to a disc clamping device in which a clamp piston causes a pressing force to act upon a sliding disc mounted to the main shaft. As described in detail later, the rotational resistance applying device according to the embodiment includes three hollow rollers serving as rolling members that can be resiliently deformed. The hollow rollers are disposed between the clamp piston (serving as a frame-side pressing member) and the sliding disc (serving as a main-shaft-side press member). That is, in the embodiment, the disc clamping device is used as what is called the rotational resistance applying device in the present invention.

First, the structure of a rotary index table device 1 will be described with reference to FIG. 1. In the description below, "axial direction" refers to the direction of an axis of a main shaft 4a that supports a circular table 5 serving as a member that is rotationally driven, and "radial direction" refers to the direction of a radius of the circular table 5 and the main shaft 4a that are coaxially disposed.

In FIG. 1, the rotary index table device 1 includes a frame 2, the main shaft 4a, a driving device 6, and a clamping device 10. The main shaft 4a is rotatably supported by the frame 2. The driving device 6 is provided for rotationally driving the main shaft 4a. The clamping device 10 maintains an indexed rotational angle of the main shaft 4a.

The frame 2 is formed so that a surface to which a machine tool is set is formed as a smooth surface. The frame 2 is formed by separately forming a casing member 28a, a casing member 28b, and a base member 29, and by combining them with a plurality of mounting bolts 27. The base member 29 has a cylindrical base portion 11 that surrounds the main shaft 4a. The cylindrical base portion 11 may be formed as a separate member, and mounted using, for example, a bolt.

The main shaft 4a is inserted in the interior of the cylindrical base portion 11 in the frame 2, and is rotatably supported by the frame 2 using a bearing 3. A flange 4b is mounted to one end of the main shaft 4a, and the circular table 5 is mounted to the flange 4b. The other end of the main shaft 4a is inserted in a hole 16a of a disc-shaped protruding member 16, and protrudes from the hole 16a. The protruding member 16 is mounted to an inner periphery of the base member 29 with a plurality of mounting bolts 31.

The circular table 5 is fitted to a circular-table-5-side end face of the flange 4b (upper surface in FIG. 2) at a central hole 13a. With the circular table 5 being positioned with respect to the flange 4b by the fitting operation, the circular table 5 is mounted to the end face of the flange 4b with a plurality of mounting bolts 12.

With the flange 4b being fitted to one end of the main shaft 4a at a central hole 13b and being positioned by the fitting operation, the flange 4b is mounted to an end face of the main shaft 4a with a plurality of mounting bolts 30. A cylindrical holding portion 23 extending the axial direction of the main shaft 4a from the circular table 5 is integrally formed with the flange 4b, and surrounds the base portion 11. Although the holding portion 23 and the flange 4b are formed separately from the circular table 5, and secured to the circular table 5, the holding portion 23 and the flange 4b may be integrally formed with the circular table 5. The holding portion 23 may be integrally formed with the main shaft 4a.

The main shaft 4a is supported with the bearing 3 provided between the outer peripheral surface of the main shaft 4a and the inner peripheral surface of the base portion 11. In the embodiment shown in FIG. 1, three of the bearings 3 are combined to support the main shaft 4a. With inner ring sides of these bearings 3 being interposed between a stepped portion, formed at the outer peripheral surface of the main shaft 4a, and the vicinity of the central hole 13b at the flange 4b, the inner ring sides of the bearings 3 are secured to the main shaft 4a. With outer ring sides of the bearings 3 being interposed between a stepped portion (formed at the inner peripheral surface of the base portion 11) and an annular bearing holder 14 (mounted to an end face of the base portion 11 with a bolt 15), the outer ring sides of the bearings 3 are secured to the base portion 11.

A sliding disc 43 that receives a press-contact force by the clamping device 10 is mounted to the main shaft 4a. The sliding disc 43 is a resiliently deformable member formed of a disc-shaped thin plate. The inner peripheral side of the sliding disc 43 is secured to the main shaft 4a with a mounting bolt 19.

Further, a detection ring 21, which constitutes part of a rotation detector 20, is mounted to the other end of the main shaft 4a that protrudes from the hole 16a of the protruding member 16. The rotation detector 20 detects the rotational angle (that is, the amount of rotation) of the main shaft 4a. The rotation detector 20 includes the detection ring 21, mounted to the main shaft 4a, and a detection sensor 22, mounted to the protruding member 16 at the frame 2. An outer peripheral space at the main shaft 4a at the other end of the main shaft 4a where the rotation detector 20 is provided is covered with a cover member 18. The cover member 18 is mounted to the base member 29 with a mounting bolt 17.

The main shaft 4a having the above-described structure is rotationally driven by the driving device 6. As the driving device 6, a DD motor 9 that rotationally drives the main shaft 4a without using a driving transmission unit (such as a gear) is used. The DD motor 9 is concentrically disposed with the main shaft 4a along the axis of the main shaft 4a. The DD motor 9 includes a motor rotor 7 and a motor stator 8. That is, the DD motor 9 is what is called an inner rotor type. The DD motor 9 is connected to a controlling device of a machine tool (not shown). Driving of the DD motor 9 is controlled by the controlling device.

With the motor rotor 7 being fitted to the outer peripheral surface of the holding portion 23 at the flange 4b, using a mounting bolt 24 inserted from the flange 4b, the motor rotor 7 is mounted so as to be incapable of rotating relative to the flange 4b. Therefore, the motor rotor 7 is incapable of rotating relative to the main shaft 4a to which the circular table 5 is secured.

The motor stator 8 is disposed so as to surround the outer peripheral surface of the motor rotor 7. That is, the motor stator 8 is mounted to the frame 2 while the inner peripheral surface of the motor stator 8 faces the outer periphery of the motor rotor 7 and a slight gap is formed between the inner peripheral surface of the motor stator 8 and the outer peripheral surface of the motor rotor 7. The motor stator 8 is fitted to the inner peripheral surface of a stator sleeve 25 so as to be incapable of rotating relative to the inner peripheral surface of the stator sleeve 25. With the stator sleeve 25 being fitted to the inner peripheral surface of the casing member 28a of the frame 2, the stator sleeve 25 is mounted to the frame 2 with a mounting bolt 26 inserted from the base member 29 of the frame 2. Therefore, within the frame 2, the motor stator 8 is provided so as to be incapable of rotating relative to the frame 2.

The clamping device 10 includes an annular clamp piston 45 (serving as a pressing member), hollow rollers 46a and 46b (serving as resiliently deformable rolling members), and a pressing force applying device 48. The pressing force applying device 48 includes an operating fluid supplying mechanism 42, a spring member 47, a first pressure chamber 49a, and a second pressure chamber 49b.

The hollow rollers 46a are disposed between the clamp piston 45 (serving as the frame-2-side pressing member) and the sliding disc 43 (serving as the main-shaft-4a-side press member). The clamping device 10 in the embodiment applies two types of rotational resistances to the sliding disc 43 by causing pressing force applied to the clamp piston 45 by the pressing force applying device 48 to act upon the sliding disc 43 either directly or through the hollow rollers 46a.

In FIG. 1, the operating fluid supplying mechanism 42, which constitutes part of the clamping device 10, is illustrated in detail. The other structural features of the clamping device 10 are described in detail below with reference to FIGS. 2 and 3. The operating fluid supplying mechanism 42 includes a first port 40a and a second port 40b, a first communication path 39a and a second communication path 39b, a first flow path and a second flow path (in FIG. 1, only a first flow path 38a is shown), an operating fluid supply source 101, an operating fluid tank 100, and a fluid supplying device 41. The first port 40a and the second port 40b are formed so as to open towards an outer surface of the casing member 28a of the frame 2. The first communication path 39a and the second communication path 39b are formed in the casing member 28a. The first and second flow paths are formed in the base member 29 of the frame 2. The operating fluid supply source 101 is provided for supplying operating fluid (such as pressure oil). The fluid supplying device 41 is connected to the operating fluid supply source 101.

The first flow path 38a and the first communication path 39a, connected to the first flow path 38, connect the first pressure chamber 49a and the first port 40a. The first port 40a is connected to the fluid supplying device 41 provided separately from the frame 2. In addition, the second flow path (not shown) and the second communication path 39b, connected to the second flow path, connect the second pressure chamber 49b and the second port 40b. The second port 40b is connected to the fluid supplying device 41.

The fluid supplying device 41 includes a selector valve (not shown), which is controlled by the controlling device of the machine tool. One side of the selector valve is connected to the operating fluid supply source 101 and the tank 100 through flow paths, and the other side of the selector valve is connected to the first port 40a and the second port 40b through flow paths. The fluid supplying device 41 supplies operating fluid having a predetermined pressure from the common operating fluid supply source 101 to the first port 40a or the second port 40b by selectively switching between the first port 40a and the second port 40b by the selector valve. Accordingly, the fluid supplying device 41 selectively supplies the operating fluid having the predetermined pressure to at least one of the first and second pressure chambers 49a and 49b.

Although the details will be given later with reference to FIGS. 2 and 3, when the main shaft 4a is in a partially clamped state, the fluid supplying device 41 does not supply operating fluid to the first port 40a and to the second port 40b. In this case, a first pressing force, applied to the clamp piston 45 in the direction of the sliding disc 43 by an urging force of a spring member 47, acts upon the sliding disc 43 through the hollow rollers 46a. This causes the hollow rollers 46a to deform. By rolling resistance of the deformed hollow rollers 46a, a partially clamping rotational resistance (braking force) is applied to the main shaft 4a. The "partially clamped state" refers to a state in which the clamping device 10 causes a pressing force (for applying rotational resistance) to act upon the main shaft 4a within a range that allows rotation of the main shaft 4a.

When the main shaft 4a is in a completely clamped state, the fluid supplying device 41 supplies operating fluid having a predetermined pressure to the first port 40a. In this case, a second pressing force, applied to the clamp piston 45 in the direction of the sliding disc 43 by the pressing force applying device 48 (that is, the sum of a pressing force oriented in the direction of the sliding disc 43 and generated by operating fluid supplied from the fluid supplying device 41 to the first pressure chamber 49a and a pressing force oriented in the direction of the sliding disc 43 and generated by the spring member 47), directly acts upon the sliding disc 43. This causes a completely clamping rotational resistance to be applied to the sliding disc 43. The "completely clamped state" refers to a state in which the clamping device 10 causes a pressing force (for applying rotational resistance that does not allow rotation of the main shaft 4a) to act upon the main shaft 4a.

When the main shaft 4a is set to an unclamped state, the fluid supplying device 41 supplies operating fluid having a predetermined pressure to the second port 40b. In this case, since the predetermined pressure of the operating fluid acts upon the second pressure chamber 49b (which is capable of performing an unclamping operation), the pressing force applying device 48 causes an unclamping pressing force to act upon the clamp piston 45, so that the hollow rollers 46a (disposed at an end portion of the clamp piston 45) move away from the sliding disc 43. As a result, the main shaft 4a is in an unclamped state. The unclamping pressing force is applied against the urging force of the spring member 47 by the pressing force applying device 48, and is stronger than the urging force.

Next, the structure of the rotational resistance applying device (that is, the clamping device 10) according to the embodiment will be described in detail with reference to FIGS. 2 and 3. The clamp piston 45, serving as a pressing member, is accommodated in a state in which the clamp piston 45 can move in the axial direction with respect to a guide groove 51. The guide groove 51 is formed in the protruding member 16 at the frame 2. At a portion of the protruding member 16 (at the frame 2) facing the sliding disc 43, the guide groove 51 is formed so as to open at the sliding disc 43. Therefore, the clamp piston 45 accommodated the guide groove 51 is such that its circular-table-5-side end face (=a sliding-disc-43-side end face) faces the sliding disc 43.

The clamp piston 45 has an annular cutaway portion 52 formed at an outer peripheral portion of the sliding-disc-43-side end face. A bottom surface 45a of the cutaway portion 52 corresponds to what is called a first surface in the present invention. A surface 45b other than the cutaway portion 52 at the sliding-disc-43-side end face of the clamp piston 45 corresponds to what is called a third surface in the present invention. Of portions of a clamp-piston-45 side surface of the sliding disc 43, a portion 43a facing the first surface 45a corresponds to what is called a second surface in the present invention, and a portion 43b facing the third surface 45b corresponds to what is called a fourth surface in the present invention. That is, in the embodiment, the second surface 43a and the fourth surface 43b are flush with each other.

A holder 56a is disposed in the cutaway portion 52. The hollow rollers 46a are held by the holder 56a. The cutaway portion 52 is such that its size in the axial direction thereof, that is, the distance between the first surface 45a and the third surface 45b is less than the diameter in a pressing direction of the hollow rollers 46a resiliently deformed by the partially unclamping first pressing force and is greater than or equal to the diameter in the pressing direction of the hollow rollers 46a resiliently deformed by the completely clamping second pressing force that is greater than the first pressing force.

In a state in which the first pressing force acts upon the hollow rollers 46a (that is, in a state in which the pressure of the operating fluid from the fluid supplying device 41 does not act upon the clamp piston 45), the third surface 45b does not contact the fourth surface 43b of the sliding disc 43. In contrast, when the second pressing force acts upon the hollow rollers 46a (that is, when the operating fluid having a predetermined pressure from the fluid supplying device 41 acts upon the first pressure chamber 49a), the third surface 45b press-contacts the fourth surface 43b of the sliding disc 43. That is, the third surface 45b faces the fourth surface 43b of the sliding disc 43 at a distance that is less than the amount of change in the diameter of the hollow rollers 46a resulting when the state in which the first pressing force acts upon the hollow rollers 46a changes to the state in which the second pressing force acts upon the hollow rollers 46a.

The clamp piston 45 has an annular protruding portion 53 that is formed at the lower end of the inner peripheral portion of the clamp piston 45, and that protrudes towards the inner periphery. At a position between the protruding portion 53 and the sliding disc 43, an annular flange member 54 is mounted to a sliding-disc-43-side end face of the protruding member 16 at the frame 2 with a mounting bolt 32 (see FIG. 1). The outer peripheral surface of the flange member 54 is in close contact with the inner peripheral surface of the clamp piston 45 with a seal 55 being interposed therebetween.

Further, in the embodiment, in addition to the hollow rollers 46a provided at a clamp-piston-45 side of the sliding disc 43, three other hollow rollers 46b are provided at a circular-table-5 side of the sliding disc 43.

A stepped portion 61 protruding inwardly in the radial direction from the inner peripheral surface of the base portion 11 of the base member 29 of the frame 2 is formed at the base portion 11. The lower surface of the stepped portion 61 faces a circular-table-5-side surface of the sliding disc 43. A groove 62 is formed at a position facing the outer peripheral portion of the circular-table-5-side surface of the sliding disc 43 among positions of the lower surface of the stepped portion 61.

In addition, in the embodiment, the hollow rollers 46b, provided closer to the circular table 5 than the sliding disc 43, are disposed between a bottom surface (that is, a fifth surface) 11a at the groove 62 and a circular-table-5-side surface (that is, a sixth surface) 43c of the sliding disc 43 facing the fifth surface 11a. The hollow rollers 46b are held by a holder 56b. A surface (that is, a seventh surface) 11b of the lower surface of the stepped portion 61 situated closer to the inner periphery than the groove 62 faces a circular-table-5-side surface (that is, an eighth surface) 43d of the sliding disc 43 at a distance that is less than the amount of change in the diameter of each hollow roller 46b occurring when a state in which a force corresponding to the first pressing force acts upon the hollow rollers 46b changes to the state in which a force corresponding to the second pressing force acts upon the hollow rollers 46b.

Figure 4:
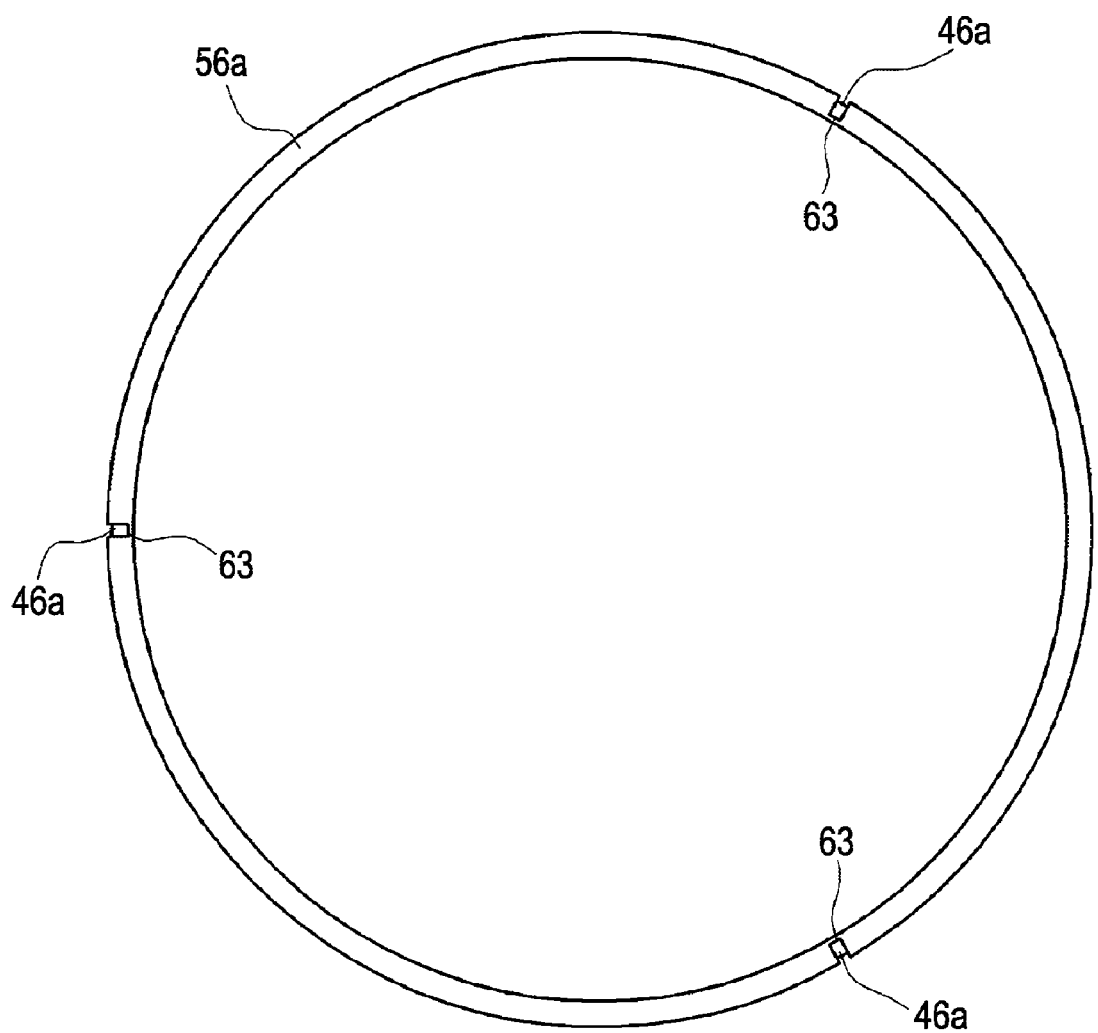
FIG. 4 shows an exemplary arrangement of hollow rollers according to the present invention.
Figure 5:
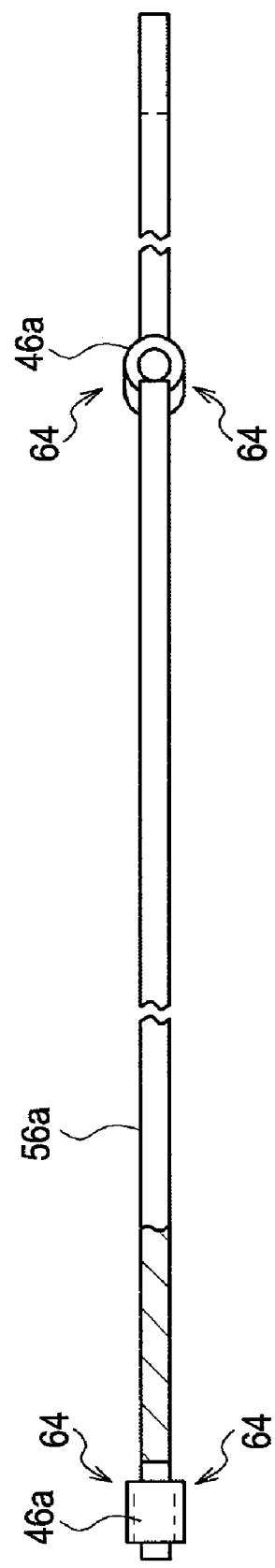
FIG. 5 shows an exemplary arrangement of the hollow rollers according to the present invention.

Next, the holders 56a and 56b for holding the hollow rollers 46a and 46b of the clamping device 10 will be described. FIGS. 4 and 5 show an exemplary disposition of the hollow rollers 46a in the holder 56a, provided for holding the hollow rollers 46a and provided closer to the clamp piston 45 than the sliding disc 43. FIG. 4 is a top view of the holder 56a. FIG. 5 is a partial sectional front view of the holder 56a as seen from the same direction as FIGS. 2 and 3. In the embodiment, the holders 56a and 56b have the same structure. Here, only the holder 56a will be described.

As shown in FIGS. 4 and 5, in the embodiment, three hollow rollers 46a are provided at the same interval on the annular holder 56a. The holder 56a is a substantially donut-shaped disc whose plate thickness is less than its diameter in the axial direction after the hollow rollers 46a are resiliently deformed by the second pressing force. The holder 56a has three pockets 63 provided at the same angular interval at the outer peripheral surface thereof. The pockets 63 do not extend through the inner peripheral surface of the holder 56a in the direction of the center of the disc from the outer peripheral surface of the holder 56a.

These pockets 63 are holes that are formed from the outer peripheral surface of the holder 56a with an end mill whose diameter is larger than that of the hollow rollers 46a. Therefore, the diameter of each pocket 63 is greater than the plate thickness of the holder 56a. The pockets 63 have open portions 64 that open at respective sides in the plate thickness direction of the holder 56a. The open portions 64 are formed so that the width in a circumferential direction at the respective sides of the holder 56a is less than the diameter of the hollow rollers 46a. The hollow rollers 46a are mounted to these three pockets 63, and the outer peripheral surfaces of the hollow rollers 46a protrude outward from the open portions 64 of the pockets 63 (see FIG. 5). The holder 56a is vertically supported by the hollow rollers 46a mounted to the pockets 63.

At a position between the first surface 45a (corresponding to the bottom surface defining the cutaway portion 52 of the clamp piston 45) and the second surface 43a of the sliding disc 43, the hollow rollers 46a, mounted to the three pockets 63 of the holder 56a, are held by the holder 56a while their axes are oriented towards the axial core of the main shaft 4a and the intervals between the hollow rollers 46a are maintained. At a position between the fifth surface 11a (corresponding to the bottom surface at the groove 62 of the base member 11 at the frame 2) and the sixth surface 43c of the sliding disc 43, the hollow rollers 46b are held by the holder 56b while their axes are oriented towards the axial core of the main shaft 4a and the intervals between the hollow rollers 46b are maintained.

The three hollow rollers 46b, provided at the circular-table-5 side of the sliding disc 43, may be provided at positions corresponding to the positions of the three hollow rollers 46a, provided at the clamp-piston-45 side of the sliding disc 43. Alternatively, they may be provided at positions shifted from each other in the radial direction and a rotational direction of the circular table 5.

As mentioned above, the pressing force applying device 48 includes the spring member 47 (which causes the partial clamping first pressing force to act upon the clamp piston 45), the operating fluid supply source 101 (which supplies operating fluid that causes a pressing force which becomes the completely clamping second pressing force to act upon the clamp piston 45 in addition to the first pressing force), the fluid supplying device 41, and the first pressure chamber 49a. Further, the pressing force applying device 48 includes the second pressure chamber 49b for supplying operating fluid that causes an unclamping pressing force to act upon the clamp piston 45.

A space surrounded by a lower end surface (that is, an end surface at a side opposite to the sliding disc 43) of the clamp piston 45 and the guide groove 51 corresponds to the first pressure chamber 49a. The spring member 47 that causes the aforementioned first pressing force to act upon the clamp piston 45 is provided at the first pressure chamber 49a. The spring member 47 is a compression spring. A plurality of the spring members 47 are provided at positions between a groove 51b (which opens in the bottom surface 51a at the guide groove 51) and a lower end surface 45c of the clamp piston 45.

The lower end surface of the clamp piston 45 has an area that makes it possible for the main shaft 4a to be in a completely clamped state by a press-contact force that causes the third surface 45b and the fourth surface 43b to directly press-contact each other due to further resilient deformation of the hollow rollers 46a when a predetermined pressure of operating fluid supplied to the first pressure chamber 49a acts upon the clamp piston 45 in addition to spring force of the spring member 47.

A space surrounded by the inner peripheral surface of the clamp piston 45, a sliding-disc-43-side surface of the protruding portion 53 of the clamp piston 45, the flange member 54, and an inner peripheral surface 51c at the guide groove 51 corresponds to the second pressure chamber 49b. The sliding-disc-43-side surface of the protruding portion 53 of the clamp piston 45 is formed so as to have an area that makes it possible for the clamp piston 45 to cause a pressing force that is larger than an urging force of the spring member 47 to act upon the spring member 47 when a predetermined pressure of operating fluid supplied to the second pressure chamber 49b acts upon the clamp piston 45. In addition, at a position where the first flow path 38a opposes the lower end surface 45c of the clamp piston 45, the first flow path 38a communicates with the first pressure chamber 49a. At a position between the flange member 54 at the inner peripheral surface 51c at the guide groove 51 and the protruding portion 53 of the clamp piston 45, the second flow path (not shown) communicates with the second pressure chamber 49b.

As mentioned above, the first pressure chamber 49a communicates with the first port 40a, formed so as to open towards the outer surface of the casing member 28a, through the first flow path 38a and the first communication path 39a. The first port 40a is connected to the fluid supplying device 41 provided separately from the frame 2. The second flow path (not shown) and the second pressure chamber 49b communicate with the second port 40b, formed so as to open towards the outer surface of the casing member 28a, through the second communication path 39b. The second port 40b is connected to the fluid supplying device 41.

By the above-described structure, the pressing force applying device 48 generates the first pressing force (which causes the main shaft 4a to be in a partially clamped state) by the spring member 47. The pressing force applying device 48 generates the second pressing force (which causes the main shaft 4a to be in a completely clamped state) by the first pressing force and a pressing force generated when a predetermined pressure of the operating fluid acts upon the first pressure chamber 49a. When a predetermined pressure of the operating fluid acts upon the second pressure chamber 49b, the pressing force applying device 48 generates an unclamping pressing force that opposes the urging force of the spring member 47.

Next, the operation of the clamping device 10 having the above-described structure according to the embodiment will be described. When indexing the angular position of the main shaft 4a, the controlling device (not shown) of a machine tool controls the selector valve (not shown) of the fluid supplying device 41, and operating fluid is supplied to only the second port 40b. By this, the clamp piston 45 is moved towards a side opposite to the sliding disc 43 against the urging force of the spring member 47, to move the second surface 43a and the fifth surface 11a away from the hollow rollers 46a and the hollow rollers 46b, respectively, so that the clamping device 10 is set in an unclamp state. Then, by driving the DD motor 9, the angular position of the main shaft 4a is indexed.

Thereafter, while the main shaft 4a is held at the indexed angular position, that is, when the main shaft 4a is set in a completely clamped state and a workpiece is processed, first, the controlling device of the machine tool controls the selector valve (not shown) of the fluid supplying device 41, and a flow path at the second port 40b is caused to communicate with the tank 100, to reduce the internal pressure of the second pressure chamber 49b. Next, the controlling device of the machine tool controls the selector valve (not shown) of the fluid supplying device 41, and operating fluid is supplied to only the first port 40a.

By this, the pressure of the operating fluid acts upon the first pressure chamber 49a. As a result, the clamp piston 45 receives the spring force of the spring member 47, provided at the bottom surface of the clamp piston 45, and the pressure of the operating fluid, so that the clamp piston 45 is displaced towards the sliding disc 43. This causes the second pressing force to act upon the sliding disc 43 through the hollow rollers 46a. Here, the hollow rollers 46a, provided between the first surface 45a and the second surface 43a, are pressed and resiliently deformed, and the third surface 45b press-contacts the fourth surface 43b. This causes the outer peripheral portion of the sliding disc 43 to be flexed and deformed towards the circular table 5.

When the sliding disc 43 is flexed towards the circular table 5, the hollow rollers 46b are also pressed and resiliently deformed between the fifth surface 11a and the sixth surface 43c. In addition, when the sliding disc 43 is flexed and deformed, the seventh surface 11b press-contacts the eighth surface 43d.

At this time, friction forces generated between the third surface 45b and the fourth surface 43b and between the seventh surface 11b and the eighth surface 43d do not allow the main shaft 4a to rotate. By this, the clamping device 10 causes the main shaft 4a to be set in a completely clamped state, and to maintain its angular position.

When the workpiece is to be finished while rotating the circular table 5, the controlling device of the machine tool controls the selector valve of the fluid supplying device 41, and a flow path at the first port 40a is caused to communicate with the tank 100. By this, the pressure of the operating fluid no longer acts upon the first pressure chamber 49a, thereby reducing the internal pressure of the first pressure chamber 49a. As a result, the pressure of the operating fluid provided by the first pressure chamber 49a no longer acts upon the bottom surface of the clamp piston 45. In this case, the clamp piston 45 causes the first pressing force, generated only by the biasing of the spring member 47, to act upon the sliding disc 43.

As a result, the third surface 45b and the fourth surface 43b are separated from each other, and the sliding disc 43 flexed by the second pressing force is restored to the state in which it is subjected to the first pressing force. This causes the seventh surface 11b and the eighth surface 43d to separate from each other, so that the main shaft 4a is no longer in the completely clamped state. Then, the hollow rollers 46a, provided between the first surface 45a and the second surface 43a, are pressed by the first pressing force, and the hollow rollers 46b, provided between the fifth surface 11a and the sixth surface 43c, are pressed by a force corresponding to the first pressing force. At this time, by the rolling resistance of the hollow rollers 46a resiliently deformed by the first pressing force and by the rolling resistance of the hollow rollers 46b resiliently deformed by the force corresponding to the first pressing force, the clamping device 10 causes the main shaft 4a to be in a partially clamped state. When the workpiece is to be finished while rotating the circular table 5 in the rotary index table device 1, the rotary index table device 1 rotates the circular table 5 while the clamping device 10 is in a partially clamping state.

As described in detail above, in the embodiment, the resiliently deformable hollow rollers 46a are provided between the first surface 45a (which is a surface of the clamp piston 45, provided adjacent to the main shaft 4a and displaceable towards the sliding disc 43, and which causes a pressing force to act upon the sliding disc 43) and the second surface 43a (which is a surface of the sliding disc 43 and which faces the first surface 45a). The pressing force applied to the clamp piston 45 acts upon the sliding disc 43 through the hollow rollers 46a that press-contact the first surface 45a and the second surface 43a due to the displacement of the clamp piston 45.

According to the embodiment having such a structure, when the clamp piston 45 is displaced towards the sliding disc 43 by the pressing force applying device 48, the first surface 45a of the clamp piston 45 presses the second surface 43a of the sliding disc 43 through the hollow rollers 46a. At this time, the hollow rollers 46a are deformed by the pressing operation. By the rolling resistance of the deformed hollow rollers 46a, rotational resistance (that is, braking force) is applied to the sliding disc 43 (that is, the main shaft 4a) within a range allowing rotation of the sliding disc 43. This makes it possible to restrict the generation of pulsation in the rotation of the main shaft 4a.

In the embodiment, in addition to the hollow rollers 46a (provided closer to the clamp piston 45 than the sliding disc 43), the resiliently deformable hollow rollers 46b are provided between the fifth surface 11a of the base portion 11 at the frame 2 and the sixth surface 43c of the sliding disc 43. By such a structure, the rolling resistance of the hollow rollers 46a resiliently deformed by the first pressing force and the rolling resistance of the hollow rollers 46b resiliently deformed by a force corresponding to the first pressing force make it possible to apply rotational resistance (that is, braking force) from both sides of the sliding disc 43, so that the generation of pulsation is effectively restricted.

In addition, according to the embodiment, even if the pressing force is applied to the clamp piston 45 for applying the rotational resistance, the hollow rollers 46a roll, and wear of the first surface 45a of the clamp piston 45 and wear of the second surface 43a of the sliding disc 43 are restricted. Further, the hollow rollers 46b roll, and wear of the fifth surface 11a of the base portion 11 and wear of the sixth surface 43c of the sliding disc 43 are restricted. Therefore, it is possible to restrict changes in the rotational resistance caused by the wear of each surface, and to maintain the magnitude of the rotational resistance applied to the main shaft 4a for a long time.

Further, in the embodiment, the plurality of (three) hollow rollers 46a are provided in the circumferential direction of the annular holder 56a. By this, it is possible to restrict tilting of the clamp piston 45 when the first surface 45a presses the second surface 43a through the hollow rollers 46a.

Further, in the embodiment, in the rotary index table device 1, the clamping device 10 having the completely clamping third surface 45b and seventh surface 11b on respective sides of the sliding disc 43 has the partially clamping first surface 45a and fifth surface 11a, which are further away from the sliding disc 43 than the third surface 45b and the seventh surface 11b. In addition, the clamping device 10 is provided with the hollow rollers 46a between the first surface 45a and the sliding disc 43 and the hollow rollers 46b between the fifth surface 11a and the sliding disc 43. Accordingly, the clamping device 10 functions as a rotational resistance applying device. That is, the clamping device 10 for maintaining the angular position of the indexed main shaft 4a functions as a rotational resistance applying device that causes a partially clamping pressing force to act upon a press member, so that the clamping device 10 is also used as a rotational resistance applying device. This makes it possible to reduce the size of the device and manufacturing costs.

Although, in the above-described embodiment, the hollow rollers 46b are provided at the circular-table-5 side of the sliding disc 43 and the hollow rollers 46a are provided at the side of the sliding disc 43 opposite to the circular table 5, the present invention is not limited thereto. For example, the hollow rollers 46a may only be provided at the side opposite to the circular table 5 (that is, adjacent to the clamp piston 45). Alternatively, the clamp piston 45 and the hollow rollers 46a may be disposed at the circular-table-5 side of the sliding disc 43.

Figure 6:
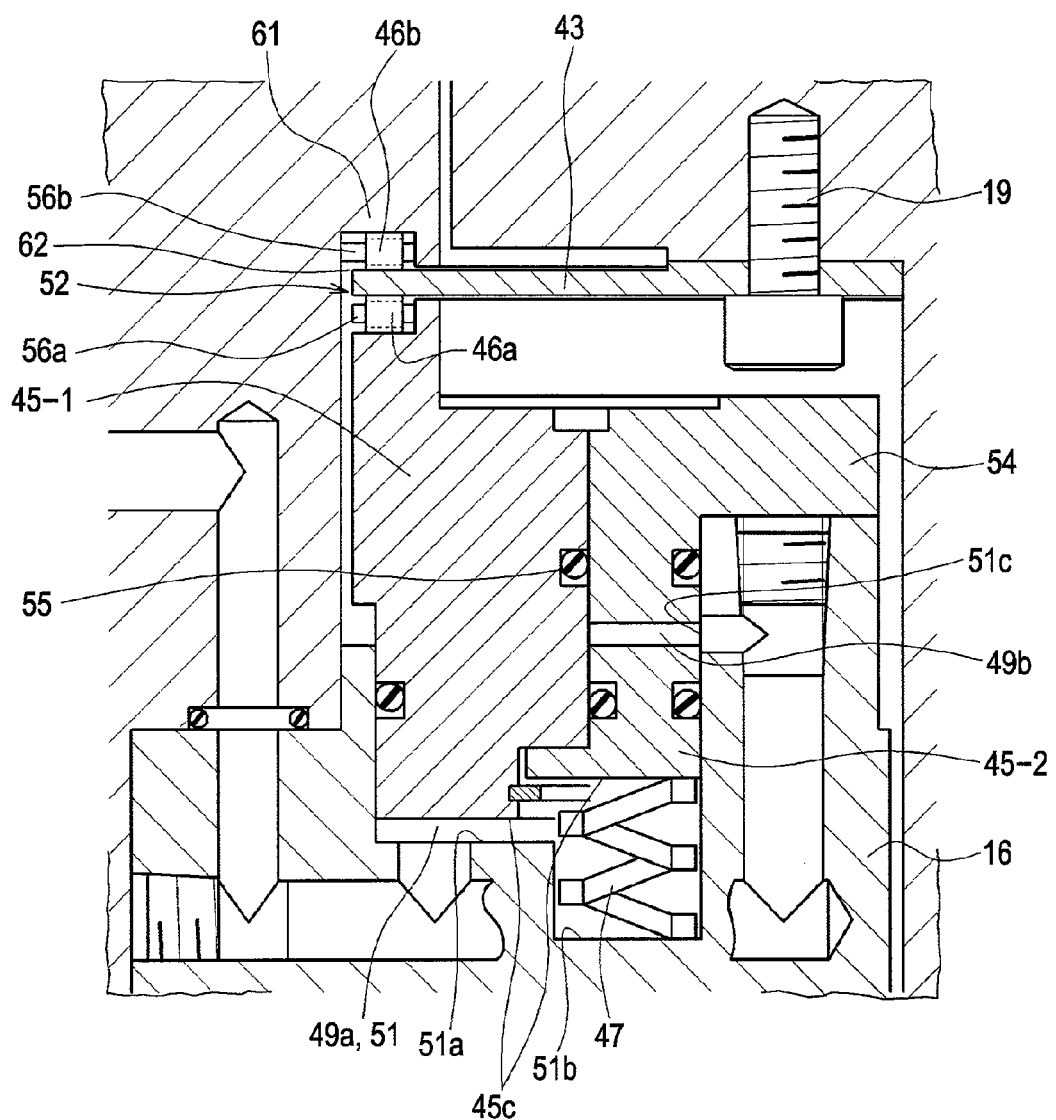
FIG. 6 shows another exemplary structure of the rotational resistance applying device according to the present invention.

In addition, although, in the above-described embodiment, the clamp piston 45 is one member, the present invention is not limited thereto. For example, as shown in FIG. 6, the clamp piston 45 may include two members, that is, a first piston member 45-1 and a second piston member 45-2.

Figure 7:
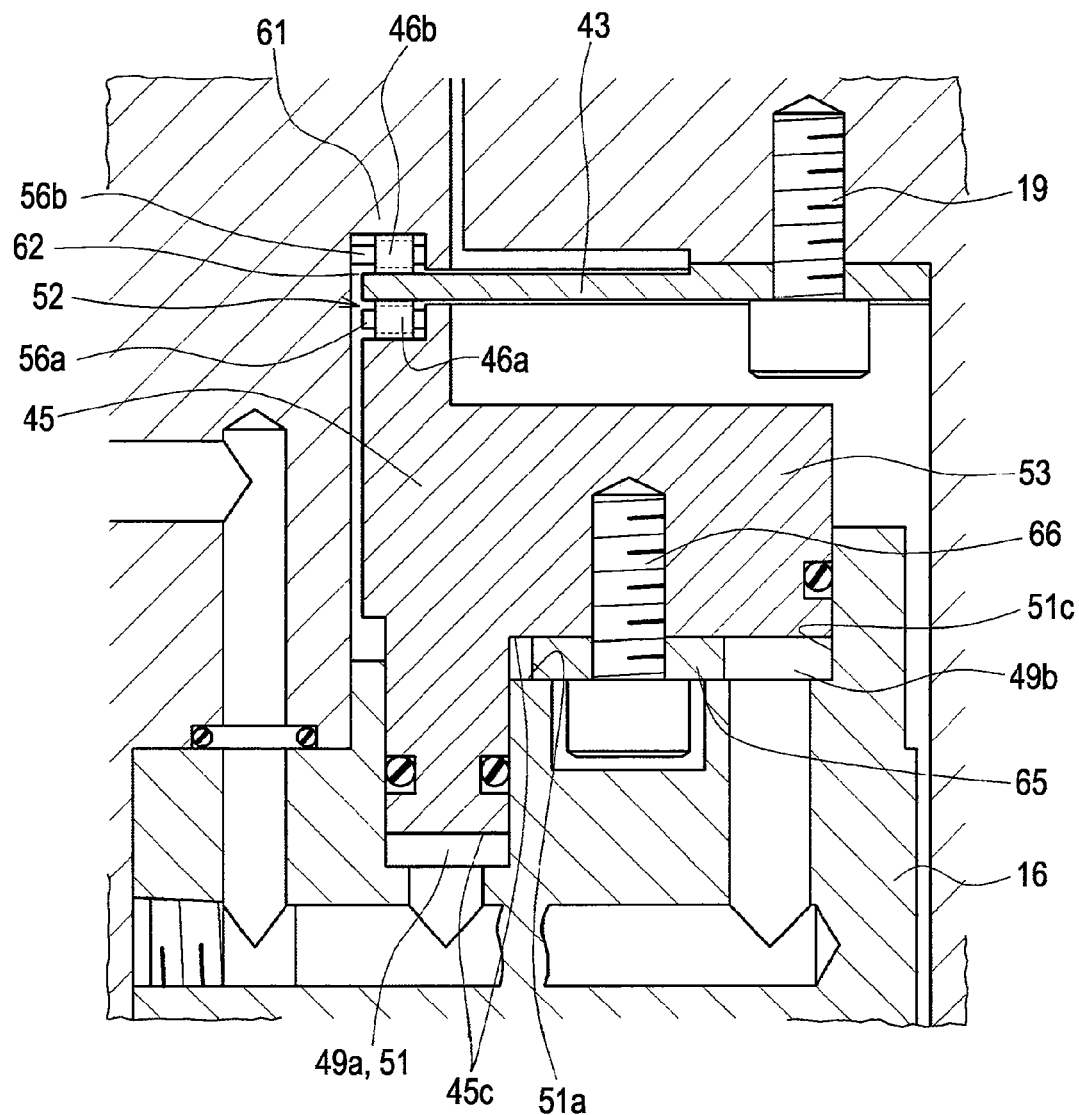
FIG. 7 shows still another exemplary structure of the rotational resistance applying device according to the present invention.

Further, in the above-described embodiment, the pressing force applying device 48 includes the spring member 47 (which causes the first pressing force to act upon the clamp piston 45), the first pressure chamber 49a (which causes a pressing force corresponding to the second pressing force to act upon the clamp piston 45 in addition to the first pressing force), and the second pressure chamber 49b (which causes an unclamping pressing force to act upon the clamp piston 45). However, the present invention is not limited thereto. For example, as shown in FIG. 7, the spring member 47 may be omitted, so that the pressing force applying device 48 includes the first pressure chamber 49a (which causes the first pressing force to act upon the clamp piston 45) and the second pressure chamber 49b (which causes the second pressing force to act upon the clamp piston 45). Here, the selector valve (not shown) of the fluid supplying device 41 switches between the flow path of the operating fluid to the first port 40a and the flow path of the operating fluid to the second port 40b.

When the clamping device 10 has the structure shown in FIG. 7, a return disc 65 is provided between the clamp piston 45 and the sliding-disc-43-side surface of the protruding portion 16. The return disc 65 is a resiliently deformable member including a thin substantially donut-shaped plate having a plurality of mounting holes (not shown) in a flat surface thereof. The return disc 65 is mounted to the protruding portion 16 and the clamp piston 45 so that the mounting holes that are adjacent to each other are alternately mounted on the clamp piston 45 and the protruding portion 16 with mounting bolts 66. Therefore, the return disc 65 connects the clamp piston 45 and the protruding portion 16 to each other so that they are incapable of rotating relative to each other, and maintains the clamp piston 45 at a retreating position by a resilient force generated at a portion between the mounting holes that are adjacent to each other.

Further, although, in the embodiment, the portion between the second surface 43a and the hollow rollers 46a and the portion between the fifth surface 11a and the hollow rollers 46b are separated from each other in an unclamped state, the present invention is not limited thereto. For example, there may be provided a light load at which the hollow rollers 46a and 46b are allowed to roll at all times and at which the rolling resistances of the hollow rollers 46a and 46b have allowable values for the unclamped state. In this case, the distance between the first surface 45a and the second surface 43a and the distance between the fifth surface 11a and the sixth surface 43c at a location where the clamp piston 45 is maximally retreated are the same as or slightly less than the diameters of the hollow rollers 46a and 47b, respectively.

Further, although, in the embodiment, the holders 56a and 56b are vertically supported by the hollow rollers 46a and 46b mounted to the pockets 63 and are such that the hollow rollers 46a and 46b do not fall out of the open portions 64, the present invention is not limited to this structure. As long as the thicknesses of the holders 56a and 56b are less than the diameters of the hollow rollers 46a and 46b, and the intervals between the hollow rollers 46a and between the hollow rollers 46a and 46b are maintained when the hollow rollers 46a and 46b are rotatable with respect to the frame 2, the faces of the holders where the pockets 63 are formed may be flat faces, or the holders 56a and 56b may be supported by the clamp piston 45, the frame 2, or the sliding disc 43 instead of the hollow rollers 46a and 46b.

Further, although, in the embodiment, the second surface 43a and the fourth surface 43b of the sliding disc 43 exist in the same plane, and the sixth surface 43c and the eighth surface 43d of the sliding disc 43 exist in the same plane, the present invention is not limited to this structure. For example, the second surface 43a and the fourth surface 43b may exist in different planes, or the sixth surface 43c and the eighth surface 43d may exist in different planes.

Figure 8:
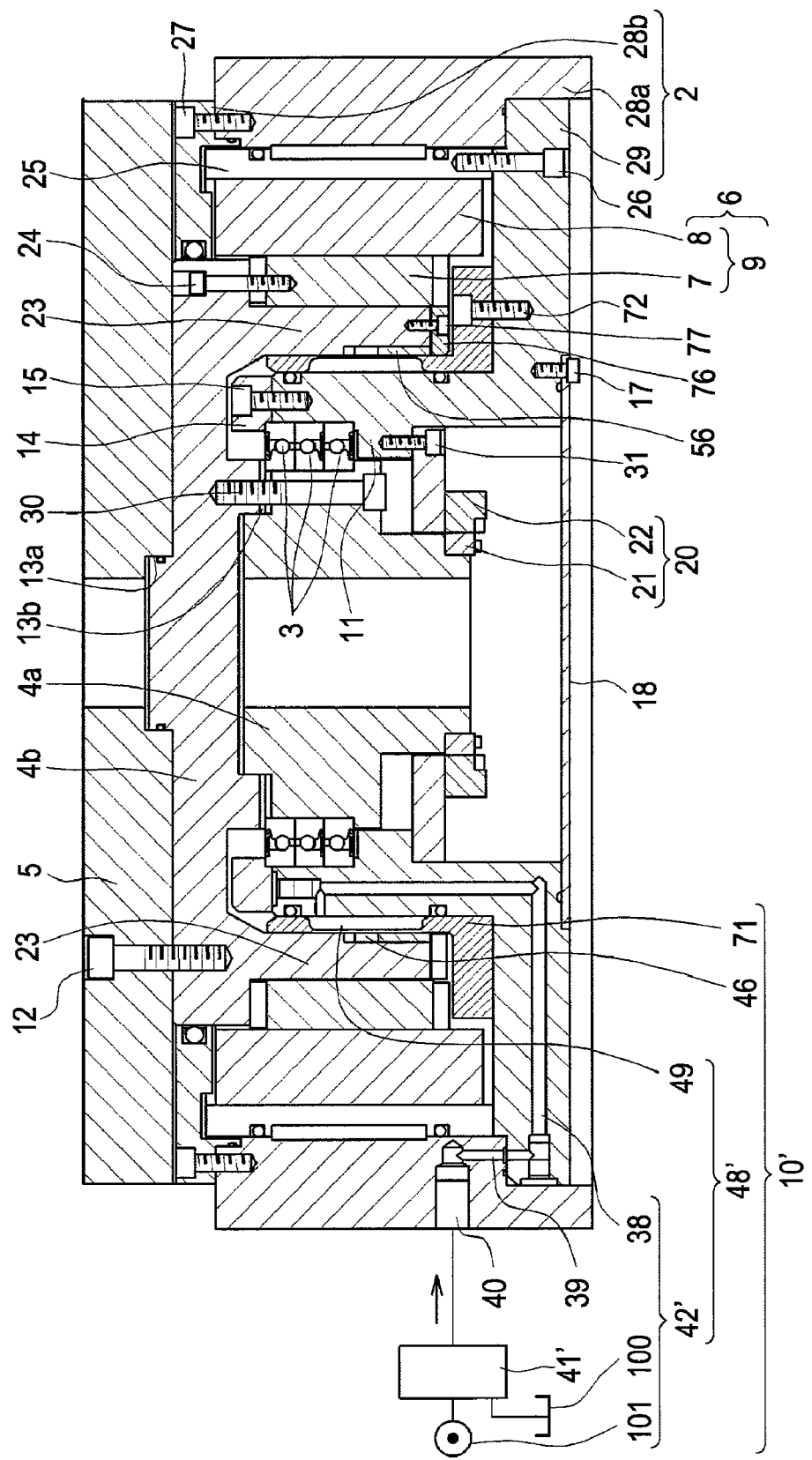
FIG. 8 shows another exemplary structure of a main shaft driving device for a machine tool including a rotational resistance applying device according to the present invention.
Figure 9:
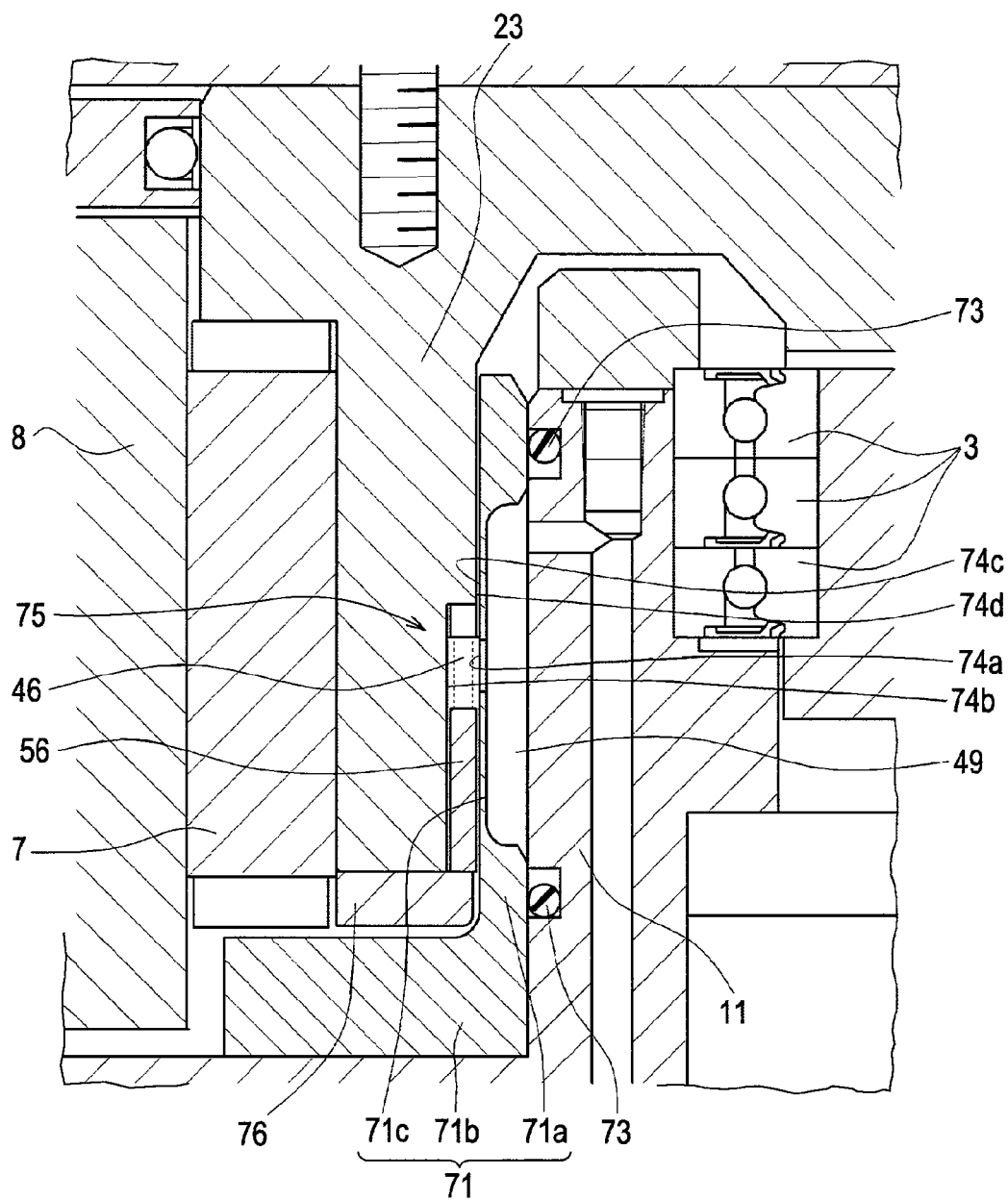
FIG. 9 shows another exemplary structure of the rotational resistance applying device according to the present invention.
Figure 10A:
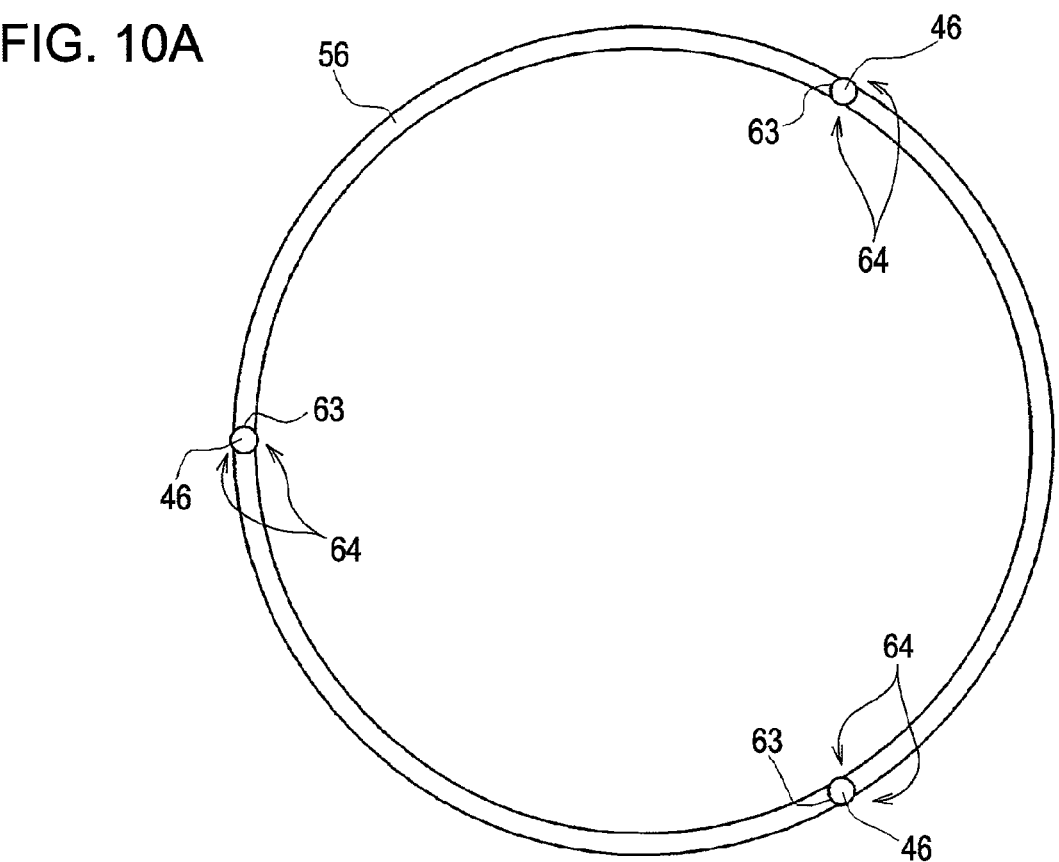
FIGS. 10A and 10B show another exemplary arrangement of hollow rollers according to the present invention.
Figure 10B:
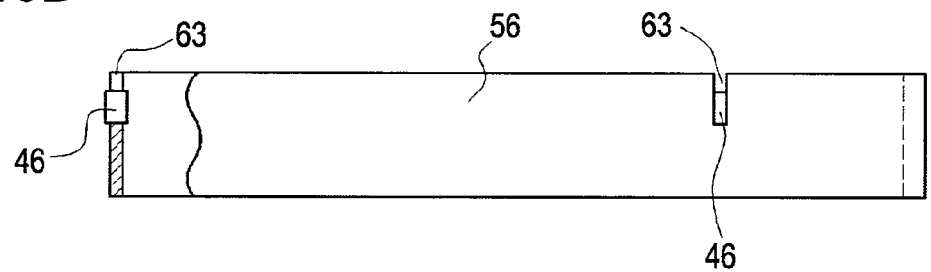

Next, a different embodiment of the present invention will be described with reference to the drawings. FIG. 8 shows another exemplary structure of a main shaft driving device 1' for a machine tool including a rotational resistance applying device according to the present invention. In FIG. 8, the portions that are given the same reference numerals as those in FIG. 1 have the same functions. Therefore, here, the same descriptions will not be repeated. FIG. 9 shows another exemplary structure of the rotational resistance applying device according to the present invention. In FIG. 9, the portions that are given the same reference numerals as those in FIGS. 2 and 3 have the same functions. Therefore, here, the same descriptions will not be repeated. FIGS. 10A and 10B show another exemplary arrangement of the hollow rollers 46 according to the present invention. FIG. 10A is a top view of a holder 56, and FIG. 10B is a partial sectional view of the holder 56 as seen from the front (that is, from the same direction as FIG. 9).

The rotational resistance applying device according to the different embodiment of the present invention is related to a sleeve clamping device 10' that applies rotational resistance to a main shaft 4a (that is, a flange 4b) by a clamp sleeve serving as a pressing member provided adjacent to a frame 2. As shown in FIG. 8, the structure of the rotary index table device 1' serving as the main shaft driving device has basically the same structure as that shown in FIG. 1. The difference is that the clamping device 10' is of a different type not including a sliding disc. For disposing the pressing member, a space between a holding portion 23 at the flange 4b and a base portion 11 of a base member 29 is formed larger than that shown in FIG. 1.

The rotary index table device 1' and the clamping device 10' will hereunder be described in more detail with reference to FIGS. 8 to 10. The clamping device 10' includes a clamp sleeve 71 (serving as a pressing member), hollow rollers 46 (serving as resiliently deformable rolling members), and a pressing force applying device 48'. The pressing force applying device 48' includes an operating fluid supplying mechanism 42' and a pressure chamber 49. The hollow rollers 46 are provided between a clamp portion 71a of the clamp sleeve 71 adjacent to the frame 2 and the holder 23 at the flange 4b adjacent to the main shaft 4a.

The clamp sleeve 71 includes the cylindrical clamp portion 71a and a flange portion 71b radially extending continuously with the clamp portion 71a. The clamp portion 71a is disposed between the base portion 11 of the frame 2 and the holding portion 23 at the flange 4b adjacent to the main shaft 4a. In addition, the clamp portion 71a is fitted to the outer side of the base portion 11, and the flange portion 71b is mounted to the base portion 29 of the frame 2 with a mounting bolt 72. The clamp portion 71a is disposed so that its outer peripheral surface faces and does not contact the inner peripheral surface of the holding portion 23, and so that its inner peripheral surface is in close contact with the outer peripheral surface of the base portion 11 through two seals 73.

The clamp sleeve 71 has a groove formed in the inner peripheral surface of the clamp portion 71a. A portion of the clamp sleeve 71 corresponding to the groove is a thin-walled portion 71c that is thin. In addition, a space surrounded by the inner surface at the groove and the outer peripheral surface of the base portion 11 is a pressure chamber 49 to which operating fluid is supplied. In FIG. 8, when operating fuel is supplied from the fluid supplying device 41' to the pressure chamber 49 through a communication path 39 and a flow path 38, the thin-walled portion 71c corresponding to the groove is flexed outward in the radial direction to increase the diameter of the pressure chamber 49. This causes a pressing force to act upon the holding portion 23 serving as a press member adjacent to the main shaft 4a.

An annular cutaway portion 75, disposed at the central position corresponding to the thin-walled portion 71c of the clamp sleeve 71 and formed by cutting away a portion having a predetermined length in the vertical direction of the holding portion 23 from the central position towards the outer periphery, is formed in the inner peripheral surface of the holding portion 23. In addition, the hollow rollers 46 are disposed by the holder 56 in a space between the inner peripheral surface defining the cutaway portion 75 and the outer peripheral surface of the clamp portion 71a of the clamp sleeve 71.

Therefore, in the embodiment, of portions of the outer peripheral surface of the clamp sleeve 71, a portion 74a facing the hollow rollers 46 in the cutaway portion 75 corresponds to what is called a first surface in the present invention. In addition, of portions of the inner peripheral surface defining the cutaway portion 75, a portion 74b facing the hollow rollers 46 corresponds to a second surface.

As in the previous embodiment, the pressing force applying device 48' causes a partially clamping first pressing force and a completely clamping second pressing force to act upon the thin-walled portion 71c of the clamp sleeve 71 by supplying operating fluid to the pressure chamber 49.

An interval between the inner peripheral surface of a portion of the holding portion 23 excluding the cutaway portion 75 and the outer peripheral surface of the clamp portion 71a of the clamp sleeve 71 is set to a distance at which, when the first pressing force provided by the operating fluid acts upon the thin-walled portion 71c, the outer peripheral surface of the thin-walled portion 71c does not contact the inner peripheral surface of the aforementioned portion of the holding portion 23 as a result of flexing of the thin-walled portion 71c when the first pressing force acts upon the thin-walled portion 71c. In addition, the aforementioned interval is set to a distance at which, when the second pressing force provided by the operating fluid acts upon the thin-walled portion 71c, the outer peripheral surface of the thin-walled portion 71c press-contacts the inner peripheral surface of the aforementioned portion of the holding portion 23 as a result of flexing of the thin-walled portion 71c when the second pressing force acts upon the thin-walled portion 71c.

Therefore, of the portions of the outer peripheral surface of the thin-walled portion 71c of the clamp sleeve 71, a portion 74c facing the holding portion 23 excluding the cutaway portion 75 corresponds to what is called a third surface in the present invention. In addition, of the portions of the inner peripheral surface of the holding portion 23 excluding the cutaway portion 75, a portion 74d facing the third surface 74c corresponds to what is called a fourth surface in the present invention.

The depth of the cutaway portion 75 in the radial direction thereof, that is, the distance between the second surface 74b and the fourth surface 74d in the radial direction is smaller than the outside diameters of the hollow rollers 46 in an undeformed state (that is, a state in which a pressing force does not act thereupon), and greater than the diameter in a pressing direction of the hollow rollers 46 that are resiliently deformed by a force corresponding to the second pressing force. In addition, the sum of the distance between the second surface 74b and the fourth surface 74d and the interval between the third surface 74c and the fourth surface 74d is equivalent to a distance that is greater than the outside diameters of the hollow rollers 46 in the undeformed state and that allows the hollow rollers 46 to be resiliently deformed when the hollow rollers 46 are pressed by the first surface 74a and are resiliently deformed between the first surface 74a and the second surface 74b in the case where the first pressing force acts upon the thin-walled portion 71c.

Therefore, when the hollow rollers 46 are not deformed, the hollow rollers 46 protrude towards the clamp sleeve 71 from the cutaway portion 75, and are separated from at least one of the clamp portion 71a and the holding portion 23. When the first pressing force acts upon the thin-walled portion 71c, the thin-walled portion 71c is flexed outward within a range in which the third surface 74c and the fourth surface

74*d* do not contact each other. In addition, the first surface 74*a* causes a pressing force to act upon the hollow rollers 46, so that the hollow rollers 46 are interposed between the first surface 74*a* and the second surface 74*b*, thereby deforming the hollow rollers 46. By this, when the flange 4*b* (that is, the holding portion 23) rotates as a result of rotation of the main shaft 4*a*, the rolling resistance of the hollow rollers 46 acts upon the holding portion 23 as rotational resistance, so that a partially clamping rotational resistance is applied to the main shaft 4*a*. When the second pressing force acts upon the thin-walled portion 71*c*, the third surface 74*c* press-contacts the fourth surface 74*d*, so that a completely clamping rotational resistance is applied to the main shaft 4*a* through the flange 4*b* (that is, the holding portion 23).

In the embodiment, as shown in FIG. 10A, three hollow rollers 46 are provided. At positions between the first surface 74*a* (corresponding to the outer peripheral surface of the clamp sleeve 71) and the second surface 74*b* (corresponding to the bottom surface of the cutaway portion 75 at the holding portion 23 and provided in correspondence with the first surface 74*a*), the hollow rollers 46 are held by the holder 56 while their axes are oriented parallel to the axis of the main shaft 4*a* and the intervals between the hollow rollers 46 are maintained.

The holder 56 is a cylinder whose thickness is less than the diameter after resiliently deforming the hollow rollers 46 by the second pressing force. The holder 56 has three pockets 63 provided at one end face (that is, a circular-table-5-side end face in the embodiment shown in FIGS. 10A and 10B) of the cylinder at equal intervals in a circumferential direction. These pockets 63 are holes that are formed from the one end face of the holder 56 in a direction parallel to the axial direction of the holder 56 with an end mill whose diameter is larger than that of the hollow rollers 46. Therefore, the diameter of each pocket 63 is greater than the wall thickness of the holder 56. The pockets 63 have open portions 64 that open at the inner peripheral surface and the outer peripheral surface of the holder 56. The open portions 64 are formed so that the width in a direction perpendicular to the axial direction and a radial direction of the inner peripheral surface and the outer peripheral surface of the holder 56 is less than the diameter of the hollow rollers 46.

The hollow rollers 46 are mounted to these three pockets 63 formed in this way, and the outer peripheral surfaces of the hollow rollers 46 protrude outward from the open portions 64 of the pockets 63. An annular retainer 76 is mounted to the lower end surface of the holder 56 with a mounting bolt 77. By this, the lower end surface of the holder 56 is disposed while being placed on a circular-table-5-side surface of the retainer 76.

The pressing force applying device 48' includes the operating fluid supplying mechanism 42' and the pressure chamber 49. The operating fluid supplying mechanism 42' includes a port 40, a communication path 39, a flow path 38, an operating fluid supply source 101, an operating fluid tank 100, and a fluid supplying device 41'. The port 40 is formed at a casing member 28*a* of the frame 2. The communication path 39 is formed in the casing member 28*a*. The flow path 38 is formed in the base member 29 of the frame 2. The operating fluid supply source 101 is provided for supplying operating fluid that causes a pressing force to act upon the clamp sleeve 71. The fluid supplying device 41' is connected to the operating fluid supply source 101.

The pressure chamber 49 is connected to the fluid supplying device 41' through the flow path 38 (formed in the base member 29 of the frame 2) and the communication path 39 and the port 40 (formed in the casing member 28*a*). The fluid supplying device 41' includes a low-pressure supplying portion and a high-pressure supplying portion (not shown) that adjust the pressure of operating fluid supplied from the operating fluid supply source 101. The low-pressure supplying portion and the high-pressure supplying portion each include a pressure regulating valve (not shown).

Using the pressure adjusting valve, the low-pressure supplying portion adjusts the pressure of the operating fluid supplied from the operating fluid supply source 101 to a pressure where a pressing force that acts upon the clamp sleeve 71 (that is, the thin-walled portion 71*c*) due to the pressure of the operating fluid becomes the first pressing force which deforms the hollow rollers 46 as a result of flexing the thin-walled portion 71*c* within a range in which the third surface 74*c* and the fourth surface 74*d* do not contact each other. Using the pressure adjusting valve, the high-pressure supplying portion adjusts the pressure of the operating fluid supplied from the operating fluid supply source 101 to a pressure where a pressing force that acts upon the clamp sleeve 71 due to the pressure of the operating fluid becomes the second pressing force which causes rotational resistance (that is, friction resistance) to act upon the holding portion 23. The rotational resistance is one that does not allow rotation of the main shaft 4*a* when the third surface 71*c* press-contacts the fourth surface 71*d* as a result of flexing of the thin-walled portion 71*c* caused by the pressing force acting upon the clamp sleeve 71.

Further, the fluid supplying device 41' includes a selector valve (not shown) that switches the flow path to the port 40 to a flow path that communicates with any one of the low-pressure supplying portion, the high-pressure supplying portion, and the tank 100. By the above-described structure, the flow path to the port 40 is switched to a flow path that communicates with any one of the low-pressure supplying portion, the high-pressure supplying portion, and the tank 100 by the selector valve of the fluid supplying device 41', so that the pressing force applying device 48' is selectively set to a state in which the first pressing force or the second pressing force is generated or a state in which a pressing force does not act.

By the above-described structure, in the embodiment, the sleeve clamping device is also used as a rotational resistance applying device that applies rotational resistance by causing a pressing force to act upon the holding portion 23 (serving as a press member adjacent to the main shaft 4*a*) through the hollow rollers 46. This makes it possible to reduce the size of the device and manufacturing costs.

Next, the operation of the clamping device 10' having the above-described structure will be described. When a workpiece on the circular table is processed in a state in which the angular position of the main shaft 4*a* is indexed (that is, in a state in which the main shaft 4*a* is completed clamped), a controlling device of a machine tool (not shown) controls the selector valve (not shown) at the fluid supplying device 41', to supply operating fluid at a high pressure from the high-pressure supplying portion to the port 40. This causes the pressure of the operating fluid from the high-pressure supplying portion to act upon the pressure chamber 49.

When the pressure (high pressure) of the operating fluid acts upon the pressure chamber 49, the thin-walled portion 71*c* of the clamp sleeve 71 is subjected to the second pressing force and is deformed in the direction in which its diameter is increased. This causes the third surface 74*c* (corresponding to a portion of the outer peripheral surface of the thin-walled portion 71*c* other than the portions corresponding to the hollow rollers 46) to press-contact the fourth surface 74*d* facing the third surface 74*c*, so that a force corresponding to the second pressing force acts upon the holding portion 23. At this time, the frictional resistance generated between the third surface 74c and the fourth surface 74d does not allow the main shaft 4a to rotate. By this, the clamping device 10' causes the main shaft 4a of the rotary index table device 1' to be in a completely clamped state, and to maintain its angular position.

When the angular position of the main shaft 4a is to be indexed, the controlling device of the machine tool controls the selector valve of the fluid supplying device 41', to cause the flow path of the port 40 to communicate with the tank 100. When the flow path to the port 40 communicates with the tank 100, the pressure of the operating fluid no longer acts upon the pressure chamber 49. This causes the thin-walled portion 71c of the clamp sleeve 71 resiliently deformed in the direction in which its diameter is increased to be restored, so that the third surface 74c separates from the fourth surface 74d. Therefore, the pressing force of the clamp sleeve 71 no longer acts upon the holding portion 23, so that the rotary index table device 1' is in an unclamping state.

When the workpiece is to be finished while rotating the circular table 5, the controlling device of the machine tool controls the selector valve of the fluid supplying device 41', to supply operating fluid at a low pressure from the low-pressure supplying portion to the port 40. This causes the pressure of the operating fluid from the low-pressure supplying portion to act upon the pressure chamber 49. When the pressure (low pressure) of the operating fluid acts upon the pressure chamber 49, the thin-walled portion 71c of the clamp sleeve 71 is subjected to the first pressing force and is deformed in the direction in which its diameter is increased. This causes the first surface 74a (corresponding to a portion of the outer peripheral surface of the thin-walled portion 71c other than the portions corresponding to the hollow rollers 46) to press the hollow rollers 46 by a force corresponding to the first pressing force. As a result, the hollow rollers 46 are compressed and resiliently deformed between the first surface 74a and the second surface 74b.

In the state in which the thin-walled portion 71c is subjected to the action of the first pressing force, the third surface 74c and the fourth surface 74d (corresponding to portions differing from the portions corresponding to the hollow rollers 46) are separated from each other. This is because the interval between the third surface 74c and the fourth surface 74d is set to a distance at which the third surface 74c and the fourth surface 74d do not contact each other when the thin-walled portion 71c is flexed in the state which the first pressing force of the operating fluid acts upon the thin-walled portion 71c. By this, the holding portion 23 is subjected to a force corresponding to the first pressing force through the hollow rollers 46 from the first surface 74a by only the portion (second surface 74b) corresponding to the hollow rollers 46.

Therefore, the rolling resistance of the hollow rollers 46 resiliently deformed by being compressed between the first surface 74a and the second surface 74b acts upon the holding portion 23 as rotational resistance allowing the holding portion 23 to rotate, and the main shaft 4a secured to the flange 4b, provided at the holding portion 23, is in a partially clamped state. Therefore, when the workpiece is processed while rotating the circular table 5 for finishing the workpiece, pulsation of the main shaft 4a is prevented. Moreover, even when a pressing force is applied to the clamp sleeve 71 for applying rotational resistance, the hollow rollers 46 roll to restrict wear of the first surface 74a at the clamp sleeve 71 and wear of the second surface 74b at the holding portion 23. Therefore, it is possible to restrict changes in the rotational resistance caused by the wear of each of these surfaces, thereby making it possible to maintain for a long time the magnitude of the rotational resistance applied to the main shaft 4a.

When the thin-walled portion 71c is flexed in the radial direction by being subjected to the action of the pressure of the operating fluid, the flexing amount of the portions thereof corresponding to the hollow rollers 46 in the circumferential direction and the flexing amount of the portions differing from the portions thereof corresponding to the hollow rollers 46 differ from each other. That is, since the portions corresponding to the hollow rollers 46 resiliently deform the hollow rollers 46 by pressing them, they are subjected to the action of an opposing force generated when the hollow rollers 46 are resiliently deformed. The flexing amount thereof is less than the flexing amount of the other portions that are not subjected to the opposing force. Since the hollow rollers move by rolling along the first surface 74a (the third surface 74c), a diameter expansion of the first surface 74a (the third surface 74c) partially varies. However, the third surface 74c and the fourth surface 74d are separated from each other, in which case a portion corresponding to where the flexing amount of the thin-walled portion 71c is largest of the third surface 74c not corresponding to the portions corresponding to the hollow rollers 46 does not contact the fourth surface 74d.

Although, in the different embodiment, the first surface 74a and the second surface 74b are separated from the hollow rollers 46 in the unclamped state, the present invention is not limited thereto. For example, the first surface 74a and the second surface 74b may contact the hollow rollers 46 even in the unclamped state so as to allow the hollow rollers 46 to rotate at all times. However, in this case, the rolling resistance of the hollow rollers 46 is set so as to provide a light load allowable for the unclamped state.

Further, although, in the embodiments, the rotary index table devices 1 and 1' in which the DD motors 9 are used as driving devices are described, the present invention is not necessarily limited to the use of the DD motors 9. For example, the driving devices may each include a motor and a reduction gear.

Further, although, in the embodiments, the rotary index table devices 1 and 1' serving as main shaft driving devices for a machine tool to which the rotational resistance applying devices (the clamping devices) are applied are described, the present invention may be applied to other main shaft driving devices such as milling heads (universal heads or spindle heads) for a machine tool or workpiece main shaft devices for a combined-machining machine tool.

Further, although, in each of the embodiments, the clamping device functions as a rotational resistance applying device that causes a partially clamping pressing force to act upon a press member, so that it is also used as a rotational resistance applying device, the present invention is not limited thereto. For example, a rotational resistance applying device that achieves a partially clamped state and a clamping device that achieves a completely clamped state may be provided together as separate devices. In addition, a clamping device that achieves a completely clamped state need not be provided, that is, a rotational resistance applying device that achieves a partially clamped state may only be provided.

Further, although, in each of the embodiments, the resiliently deformable rolling members are hollow rollers, the present invention is not limited thereto. For example, the rolling members may be resiliently deformable balls or resiliently deformable circular cylindrical rollers.

Further, although, in each of the embodiments, one holder is provided with three hollow rollers, the present invention is not limited to three hollow rollers. For example, one holder may be provided with one or two hollow rollers, or may be provided with four or more hollow rollers. However, from the viewpoint of restricting tilting of the pressing member (that is, the clamp piston 45 in FIG. 1 or the clamp sleeve 71 in FIG. 8) when the first surface presses the second surface through the hollow rollers, it is desirable to provide two or more hollow rollers, and more desirable to provide three or more hollow rollers. From the viewpoint of restricting the tilting of the pressing member, the larger the number of hollow rollers, the better. However, if there are too many hollow rollers, a larger pressure is required to resiliently deform the hollow rollers. Therefore, it is desirable to use three to five hollow rollers.

Further, although, in each of the embodiments, the rotational resistance applying device is applied to the main shaft driving device having the structure in which a member that rotates together with the main shaft 4a (that is, the sliding disc 43 in FIG. 1 or the holding portion 23 at the flange 4b in FIG. 8) serves as a press member, the present invention is not limited thereto. For example, the rotational resistance applying device may be applied to a main shaft driving device having a structure in which the main shaft 4a itself is a press member.

The above-described embodiments are merely practical forms in carrying out the present invention. Therefore, these embodiments are not to be construed as limiting the technical scope of the present invention. The present invention may be carried out in various other forms without departing from the spirit and main features thereof.

What is claimed is:

1. A rotational resistance applying device in a main shaft driving device for a machine tool, the main shaft driving device rotationally driving a main shaft rotatably supported by a frame and comprising a clamping device that causes a pressing force to act upon the main shaft for applying rotational resistance that prevents its rotation so as to maintain its angular position, the rotational resistance applying device comprising:

a pressing member provided adjacent to the frame, at least part of the pressing member being displaceable towards the main shaft, the pressing member having a first surface;

a pressing force applying device that applies a pressing force to the pressing member to displace the at least part of the pressing member towards the main shaft, so that the pressing force acts upon the main shaft or a member that rotates together with the main shaft, the main shaft or the member that rotates together with the main shaft serving as a press member that is pressed and that has a second surface; and a resiliently deformable rolling member provided between and the first surface and the second surface, the first surface causing the pressing force to act upon the press member, the second surface facing the first surface, causing a pressing force to act upon the main shaft for applying rotational resistance that allows its rotation.

2. The rotational resistance applying device in the main shaft driving device for the machine tool according to claim 1, wherein the pressing member further has a third surface facing a same direction as the first surface, and the press member further has a fourth surface facing a same direction as the second surface, the third surface facing the fourth surface, and wherein the pressing force applying device switches either a first pressing force or a second pressing force and causes either one of the first and second pressing forces to act upon the pressing member, the first pressing force resiliently deforming the rolling member by causing the rolling member to press-contact the second surface within a range in which the third surface and the fourth surface do not press-contact each other, the second pressing force resiliently deforming the rolling member by causing the rolling member to press-contact the second surface within a range in which the third surface and the fourth surface press-contact each other, the second pressing force being larger than the first pressing force.

3. The rotational resistance applying device in the main shaft driving device for the machine tool according to claim 1 or claim 2, wherein a plurality of the rolling members are provided.

* * * * *